US012069152B2

(12) United States Patent
Kobayashi (10) Patent No.: US 12,069,152 B2
(45) Date of Patent: Aug. 20, 2024

(54) IN-VEHICLE RELAY DEVICE AND RELAY METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuya Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 79 days.

(21) Appl. No.: 17/756,235

(22) PCT Filed: Nov. 10, 2020

(86) PCT No.: PCT/JP2020/041873
§ 371 (c)(1),
(2) Date: May 19, 2022

(87) PCT Pub. No.: WO2021/100548
PCT Pub. Date: May 27, 2021

(65) Prior Publication Data
US 2022/0417346 A1 Dec. 29, 2022

(30) Foreign Application Priority Data

Nov. 22, 2019 (JP) ................................ 2019-211779

(51) Int. Cl.
*G06F 15/16* (2006.01)
*H04L 12/46* (2006.01)
(Continued)

(52) U.S. Cl.
CPC .............. *H04L 69/08* (2013.01); *H04L 12/46* (2013.01); *H04L 12/66* (2013.01); *H04L 67/12* (2013.01)

(58) Field of Classification Search
CPC ......... H04L 69/08; H04L 12/46; H04L 12/66; H04L 67/12; H04L 12/413
(Continued)

(56) References Cited

U.S. PATENT DOCUMENTS

2014/0208132 A1* 7/2014 Cheston .................. H04L 12/12
713/310
2014/0241370 A1 8/2014 Itou et al.
(Continued)

FOREIGN PATENT DOCUMENTS

JP 2005-045521 A 2/2005
WO 2019-087591 A1 5/2019

OTHER PUBLICATIONS

International Search Report, Application No. PCT/JP2020/041873, mailed Feb. 9, 2021. ISA/Japan Patent Office.

*Primary Examiner* — Vivek Srivastava
*Assistant Examiner* — Karina J Garcia-Ching
(74) *Attorney, Agent, or Firm* — Honigman LLP (57) ABSTRACT

An in-vehicle relay device according to the present embodiments is an in-vehicle relay device to which first and second communication lines are connected and which relays communication between the first and second communication lines, communication being performed in accordance with first and second communication protocols on the first and second communication lines, respectively, the in-vehicle relay device including: a processing unit that can be switched to a sleep state and a non-sleep state, and that performs processing for relaying communication between the first and second communication lines when in the non-sleep state; and an activation-signal output unit that
(Continued)

outputs an activation signal conforming to the second communication protocol to the second communication line if the processing unit is in the sleep state and the activation-signal output unit receives an activation signal conforming to the first communication protocol from the first communication line.

7 Claims, 8 Drawing Sheets

(51) Int. Cl.
　　　*H04L 12/66*　　　(2006.01)
　　　*H04L 69/08*　　　(2022.01)
　　　*H04L 67/12*　　　(2022.01)
(58) Field of Classification Search
　　　USPC .......................................................... 709/230
　　　See application file for complete search history.

(56) References Cited

U.S. PATENT DOCUMENTS

2016/0288770 A1*　10/2016　Hermann ................. B60R 25/31
2019/0118736 A1*　4/2019　Bessho ............... H04L 12/5601
2020/0389469 A1*　12/2020　Litichever ............... H04W 4/40

\* cited by examiner

LEGEND
A= Ethernet communication unit
B= Ethernet PHY
C= Wake-up signal

FIG. 3

LEGEND
A= Ethernet communication unit
B= Ethernet PHY
C= Wake-up signal

LEGEND
A= Ethernet communication unit
B= Ethernet PHY
C= Wake-up signal

IN-VEHICLE RELAY DEVICE AND RELAY METHOD

CROSS-REFERENCE TO RELATED APPLICATIONS

This application is the U.S. national stage of PCT/JP2020/041873 filed on Nov. 10, 2020, which claims priority of Japanese Patent Application No. JP2019-211779 filed on Nov. 22, 2019, the contents of which are incorporated herein.

TECHNICAL FIELD

The present disclosure relates to an in-vehicle relay device and a relay method for relaying communication between first and second communication lines.

BACKGROUND

Conventionally, in a device such as an electronic control unit (ECU) or a gateway that is installed in a vehicle, control for transitioning to a sleep state (standby state, waiting state, or the like) for reducing power consumption is performed if processing is not required in a situation such as that when the vehicle engine is in a stopped state, for example. The device in the sleep state transitions from the sleep state to a non-sleep state (wake-up state, active state, or the like) and initiates processing if an activation signal (wake-up signal or the like) is received through communication, for example.

JP 2005-45521A proposes an in-vehicle gateway device in which switching circuits for switching the connection destinations of two networks between bypassing buses and a controller are used to connect the two networks to the bypassing buses in a sleep state and to the controller in a wake-up state.

Recent years have seen an increase in the number of devices installed in vehicles, and in-vehicle networks are vastly increasing in size and becoming more complex. Due to this, there are cases in which a plurality of gateways are interposed on a communication path from a first device to a second device. For example, in a case in which the first device transmits an activation signal, this activation signal successively activates gateways along the way and is successively relayed by the gateways until the second device finally receives the activation signal and activates. Due to this, there is a problem in that it takes a long time from when the first device transmits the activation signal to when the second device initiates processing. In the in-vehicle gateway device disclosed in JP 2005-45521A, a signal can be directly relayed by directly connecting the two networks in the sleep state. However, there is a problem in that this device configuration cannot be adopted if the two networks employ different communication protocols.

The present disclosure has been made in view of such circumstances, and an aim thereof is to provide an in-vehicle relay device and a relay method with which it can be expected for an activation signal to be relayed at high speed between communication lines that employ different communication protocols.

SUMMARY

An in-vehicle relay device according to the present aspect is an in-vehicle relay device to which first and second communication lines are connected and which relays communication between the first and second communication lines, communication being performed in accordance with first and second communication protocols on the first and second communication lines, respectively, the in-vehicle relay device including: a processing unit that can be switched to a sleep state and a non-sleep state, and that performs processing for relaying communication between the first and second communication lines when in the non-sleep state; and an activation-signal output unit that outputs an activation signal conforming to the second communication protocol to the second communication line if the processing unit is in the sleep state and the activation-signal output unit receives an activation signal conforming to the first communication protocol from the first communication line.

Not only can the present application be realized as a device such as an in-vehicle relay device including such a characteristic processing unit, but the present application can also be realized as a relay method including such characteristic processing as steps or as a computer program for causing a computer to execute such steps. The present application can also be realized as one or more semiconductor integrated circuits that realize a part of or the entirety of such devices, or as another device or system including such devices.

Advantageous Effects of Disclosure

According to the above, it can be expected for an activation signal to be relayed at high speed between communication lines that employ different communication protocols.

DETAILED DESCRIPTION OF PREFERRED EMBODIMENTS

First, aspects of embodiment of the present disclosure will be listed and described. The embodiments described below may at least be partially combined as appropriate.

First Aspect

An in-vehicle relay device according to the first aspect is an in-vehicle relay device to which first and second communication lines are connected and which relays communication between the first and second communication lines, communication being performed in accordance with first and second communication protocols on the first and second communication lines, respectively, the in-vehicle relay device including: a processing unit that can be switched to a sleep state and a non-sleep state, and that performs processing for relaying communication between the first and second communication lines when in the non-sleep state; and an activation-signal output unit that outputs an activation signal conforming to the second communication protocol to the second communication line if the processing unit is in the sleep state and the activation-signal output unit receives an activation signal conforming to the first communication protocol from the first communication line.

In the first aspect, the in-vehicle relay device relays communication between the first and second communication lines, on which communication is performed in accordance with the first and second communication protocols, respectively. If the processing unit, which performs relay processing, is in the sleep state and the activation-signal output unit of the in-vehicle relay device receives an activation signal conforming to the first communication protocol from the first communication line, the activation-signal output unit outputs an activation signal conforming to the second communication protocol to the second communication line. Thus, it can be expected for an activation signal to be relayed at high speed because the activation-signal output unit can output an activation signal conforming to the second communication protocol to the second communication line and activate a device connected to the second communication line even if the processing unit does not transition from the sleep state to the non-sleep state or before the processing unit transitions from the sleep state to the non-sleep state.

Second Aspect

Preferably, in a second aspect, the activation-signal output unit outputs a control signal for controlling the activation of the processing unit.

In the second aspect, the activation-signal output unit outputs a control signal for controlling the activation of the processing unit. Thus, it may become unnecessary for the processing unit to monitor the presence/absence of activation signals on the communication lines in the sleep state because it suffices for the processing unit to activate in response to a control signal from the activation-signal output unit.

Third Aspect

Preferably, in a third aspect, the processing unit does not activate in response to the activation signals and activates in response to the control signal.

In the third aspect, the processing unit does not activate in response to activation signals received via the communication lines and activates in response to a control signal from the activation-signal output unit. Thus, the processing unit can be prohibited from activating in response to activation signals, and the processing unit can be caused to activate only if deemed necessary by the activation-signal output unit.

Fourth Aspect

Preferably, in a fourth aspect, if the activation-signal output unit does not receive a response from a device connected to the second communication line after outputting the activation signal conforming to the second communication protocol to the second communication line, the activation-signal output unit outputs the activation signal conforming to the second communication protocol again.

In the fourth aspect, if the activation-signal output unit does not receive a response from a device connected to the second communication line after outputting an activation signal conforming to the second communication protocol to the second communication line, the activation-signal output unit retransmits the activation signal. Thus, the likelihood of a desired device being activated can be increased by the activation-signal output unit retransmitting an activation signal even if the activation of the desired device fails for some reason.

Fifth Aspect

Preferably, in a fifth aspect, a plurality of the second communication lines are connected to the in-vehicle relay device, and the activation-signal output unit selects the second communication line to which the activation signal conforming to the second communication protocol is to be output based on information attached to the activation signal conforming to the first communication protocol received from the first communication line.

In the fifth aspect, a plurality of second communication lines are connected to the in-vehicle relay device. If the activation-signal output unit receives an activation signal conforming to the first communication protocol from the first communication line, the activation-signal output unit, rather than outputting an activation signal conforming to the second communication protocol to all second communication lines, selects a second communication line to which an activation signal conforming to the second communication protocol is to be output based on information attached to the activation signal conforming to the first communication protocol. Thus, unnecessary activation of devices can be avoided.

Sixth Aspect

Preferably, in a sixth aspect, a conversion unit that is interposed between the second communication line and the processing unit, that can be switched to a sleep state and a non-sleep state, and that, in the non-sleep state, can perform conversion between analog signals that are transmitted and received via the second communication line and digital signals that are input to and output from the processing unit is included, and the activation-signal output unit outputs a control signal for controlling the activation of the conversion unit.

In the sixth aspect, the in-vehicle relay device includes a conversion unit that converts analog signals into digital signals and vice versa between the processing unit and the second communication line, and the conversion unit can be switched to a sleep state and a non-sleep state. The activation-signal output unit outputs a control signal for controlling the activation of this conversion unit. Thus, the amount of power consumed by the conversion unit of the in-vehicle relay device can be reduced.

Seventh Aspect

Preferably, in a seventh aspect, if the activation-signal output unit receives the activation signal conforming to the second communication protocol from the second communication line, the activation-signal output unit outputs the activation signal conforming to the first communication protocol to the first communication line.

In the seventh aspect, if the activation-signal output unit receives an activation signal conforming to the second communication protocol from the second communication line, the activation-signal output unit outputs an activation signal conforming to the first communication protocol to the first communication line. Thus, the activation-signal output unit can relay activation signals in both directions between the first and second communication lines.

Eighth Aspect

A relay method according to the an eighth aspect is a relay method executed by an in-vehicle relay device to which first and second communication lines are connected and which includes a processing unit that performs processing for relaying communication between the first and second communication lines, communication being performed in accordance with first and second communication protocols on the first and second communication lines, respectively, wherein: the processing for relaying communication between the first and second communication lines is performed by the processing unit in a non-sleep state; and an activation signal conforming to the second communication protocol is output to the second communication line if the processing unit is in a sleep state and an activation signal conforming to the first communication protocol is received from the first communication line.

In the eighth aspect, as in the first aspect, it can be expected for an activation signal to be relayed at high speed.

Specific examples of an in-vehicle relay device according to embodiments of the present disclosure will be described below with reference to the drawings. The present disclosure is not limited to these examples, and is intended to include all modifications that are indicated by the claims and are within the meaning and scope of equivalents of the claims.

System Configuration

Figure 1:
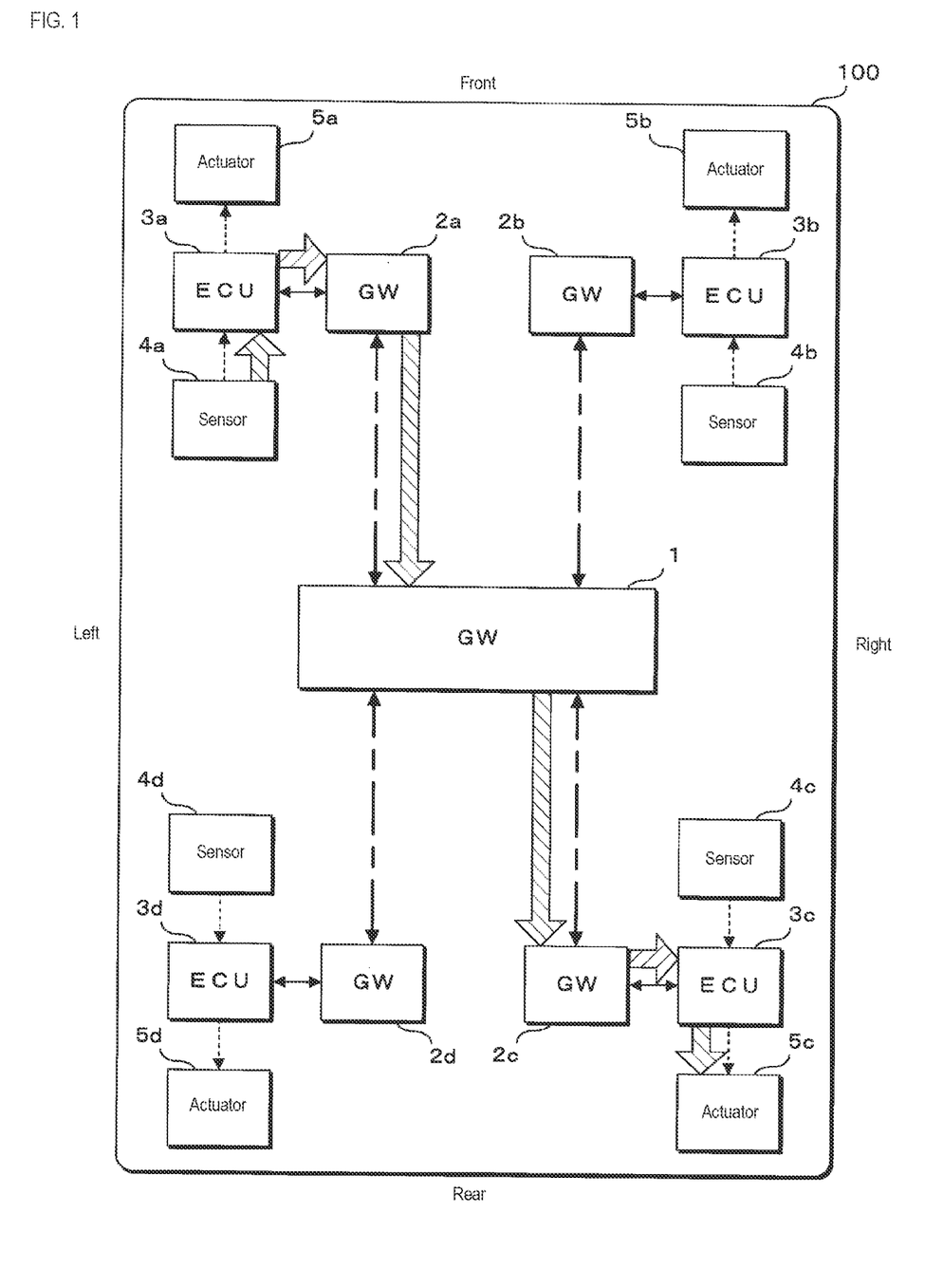
FIG. 1 is a schematic diagram illustrating one example configuration of an in-vehicle communication system according to the present embodiments.

FIG. 1 is a schematic diagram illustrating one example configuration of an in-vehicle communication system according to the present embodiments. The in-vehicle communication system according to the present embodiments has a configuration in which a central gateway (GW) 1, a plurality of peripheral GWs 2a to 2d, a plurality of ECUs 3a to 3d, a plurality of sensors 4a to 4d, and a plurality of actuators 5a to 5d are installed at suitable positions of a vehicle 100. Note that, in FIG. 1, the front, rear, left, and right directions of the vehicle 100 correspond to the top, bottom, left, and right directions in the drawing.

The GW 1 is a relay device that is arranged at the center of the vehicle 100. In the in-vehicle communication system according to the present embodiments, the four GWs 2a to 2d are each connected to the GW 1 via a communication line. In FIG. 1, the arrows illustrated with thick dashed-and-dotted lines are communication lines on which communication is performed in accordance with Ethernet (registered trademark) communication protocol. In the present embodiments, the GW 1 and the four GWs 2a to 2d communicate in accordance with Ethernet communication protocol. The GW 1 performs processing for relaying the transmission and reception of messages between the GWs 2a to 2d by transmitting a message received from one of the GWs 2a to 2d to another one of the GWs 2a to 2d.

The GWs 2 are relay devices that are arranged in peripheral portions of the vehicle. In the illustrated example, the GW 2a, the GW 2b, the GW 2c, and the GW 2d are respectively arranged in the front left, front right, rear right, and rear left portions of the vehicle 100. The GWs 2a to 2d have the nearby ECUs 3a to 3d connected thereto, respectively. Note that, while one ECU (ECU 3a, 3b, 3c, or 3d) is connected to each of the GWs 2a to 2d in the illustrated example, a plurality of ECUs (ECUs 3a, 3b, 3c, or 3d) may be connected to each of the GWs 2a to 2d. In FIG. 1, the arrows illustrated with solid lines are communication lines on which communication is performed in accordance with Controller Area Network (CAN) communication protocol. In the present embodiment, the GWs 2a to 2d and the ECUs 3a to 3d communicate in accordance with CAN communication protocol. The GWs 2a to 2d relay the transmission and reception of messages between the GW 1 and the ECUs 3a to 3d by transmitting messages received from the ECUs 3a to 3d to the GW 1 and transmitting messages received from the GW 1 to the ECUs 3a to 3d.

Note that, in the present embodiments, the GWs 2a to 2d communicate with the GW 1 in accordance with Ethernet communication protocol, and communicate with the ECUs 3a to 3d in accordance with CAN communication protocol. Thus, the GWs 2a to 2d convert messages according to communication protocols when relaying messages. The GWs 2a to 2d transmit messages conforming to CAN communication protocol received from the ECUs 3a to 3d to the GW 1 after converting the messages into messages conforming to Ethernet communication protocol. The GWs 2a to 2d transmit messages conforming to Ethernet communication protocol received from the GW 1 to the ECUs 3a to 3d after converting the messages into messages conforming to CAN communication protocol.

The ECUs 3a to 3d have sensors 4a to 4d connected thereto serving as input devices that input information, respectively, and have actuators 5a to 5d connected thereto functioning as control-target devices, respectively. Note that the input devices connected to the ECUs 3a to 3d are not limited to the sensors 4a to 4d, and may be various devices such as switches operated by a user, for example. The control-target devices connected to the ECUs 3a to 3d are not limited to the actuators 5a to 5d, and may be various devices such as motors or lights, for example. Not all of the ECUS 3a to 3d need to have both a sensor (sensor 4a, 4b, 4c, or 4d) and an actuator (actuator 5a, 5b, 5c, or 5d) connected thereto, and the ECUS 3a to 3d may only have a sensor (sensor 4a, 4b, 4c, or 4d) or an actuator (actuator 5a, 5b, 5c, or 5d) connected thereto.

For example, the ECUs 3a to 3d perform processing for controlling the operation of the control-target actuators 5a to 5d in accordance with various physical quantities sensed by the sensors 4a to 4d. The sensors 4a to 4d input, to the ECUs 3a to 3d via signal lines, analog or digital electric signals corresponding to physical quantities that are sensing results. The ECUs 3a to 3d input, to the actuators 5a to 5d via signal lines, analog or digital electric signals corresponding to control amounts of the actuators 5a to 5d. In FIG. 1, the signal lines connecting the ECUs 3a to 3d, the sensors 4a to 4d, and the actuators 5a to 5d are illustrated as broken line-arrows.

Devices such as the GW 1, the GWs 2a to 2d, and the ECUs 3a to 3d included in the in-vehicle communication system according to the present embodiments transition to a sleep state to reduce power consumption in cases such as when the engine of the vehicle 100 is stopped or the ignition switch of the vehicle 100 is turned off, for example. If it subsequently becomes necessary to activate devices and initiate processing due to some cause, wake-up signals (activation signals) are exchanged between the devices, and the devices activate in response to the wake-up signals.

In FIG. 1, one example of an information transmission path in a case in which the activation of the actuator 5c is necessitated by a sensing result of the sensor 4a is illustrated using hatched thick arrows. In the present example, the sensing result of the sensor 4a is input to the ECU 3a, and a wake-up signal is transmitted by the ECU 3a based on this sensing result. The wake-up signal transmitted by the ECU 3a is received by the GW 2a, and the GW 2a transmits a wake-up signal to the GW 1. The GW 1 receives the wake-up signal from the GW 2a, and transmits a wake-up signal to the GW 2c. Note that here, the GW 1 may also transmit wake-up signals to the GWs 2b and 2d. The GW 2c receives the wake-up signal from the GW 1, and transmits a wake-up signal to the ECU 3c. The ECU 3c receives the wake-up signal from the GW 2c, and activates in response to this wake-up signal to cause the actuator 5c to operate.

In a conventional in-vehicle communication system, the GW 2a, the GW 1, and the GW 2c each activate upon receiving a wake-up signal, and relay a wake-up signal after transitioning from the sleep state to a non-sleep state. Thus, there was the concern that it may take a long time from when the cause of activation is sensed by the sensor 4a to when the actuator 5c operates.

In contrast, in the in-vehicle communication system according to the present embodiments, the GWs 2a and 2c each relay a received wake-up signal in a bypassing manner, i.e., without waiting for a microcomputer/microcontroller or the like that performs relay processing to activate even if the microcomputer/microcontroller or the like is in a sleep state. Thus, in the in-vehicle communication system according to the present embodiments, the amount of time from when the cause of activation is sensed by the sensor 4a to when the actuator 5c operates can be reduced. Note that the GW 1 may similarly relay wake-up signals in a bypassing manner.

Embodiment 1

Figure 2:
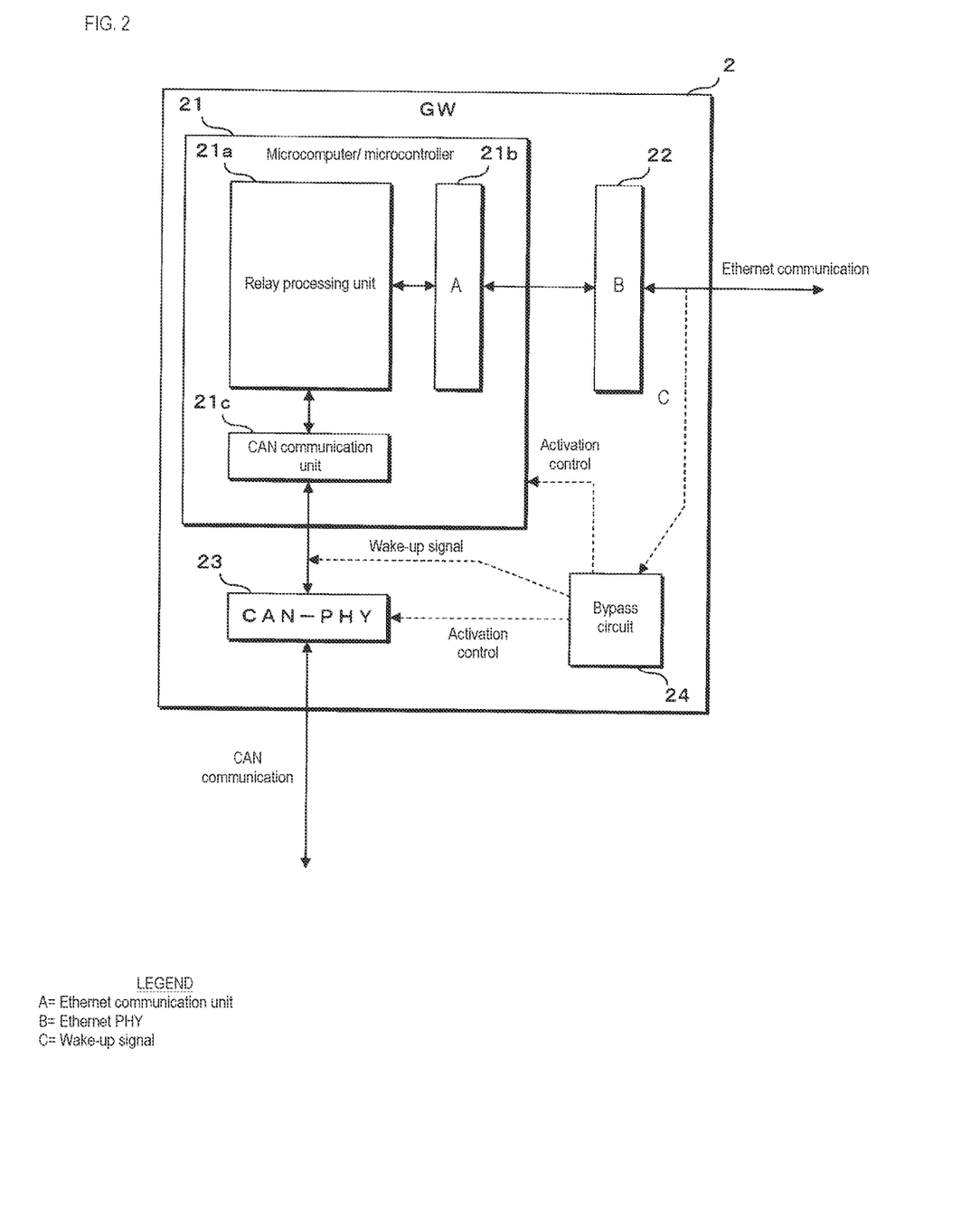
FIG. 2 is a block diagram illustrating a configuration of a GW according to embodiment 1.
Figure 3:
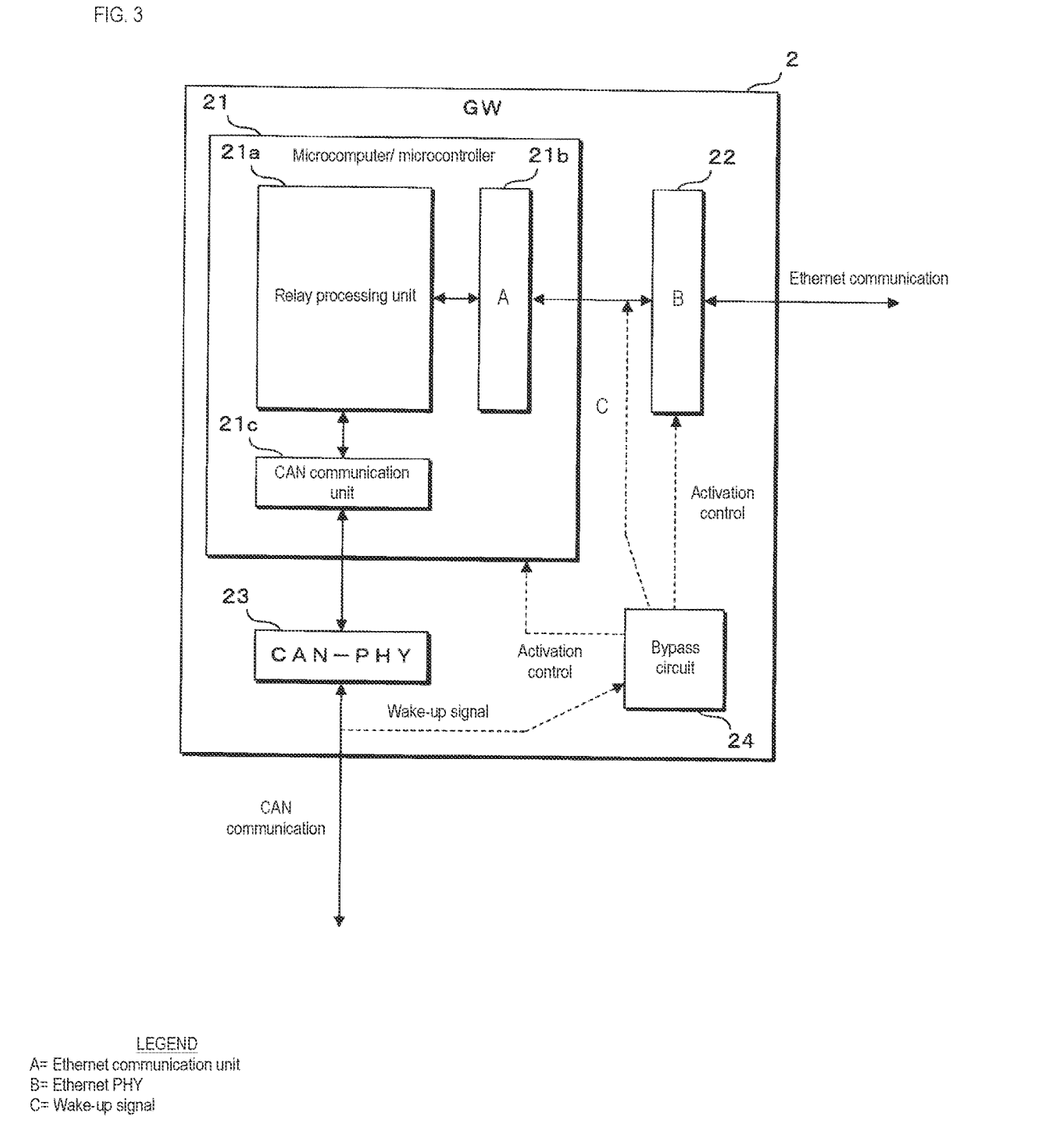
FIG. 3 is a block diagram illustrating the configuration of the GW according to embodiment 1.

FIGS. 2 and 3 are block diagrams illustrating a configuration of a GW 2 according to embodiment 1. Note that, since the plurality of GWs 2a to 2d included in the in-vehicle communication system have substantially the same configuration, description will be provided below by referring to each of the GWs 2a to 2d simply as a GW 2 whenever it is unnecessary to distinguish the GWs 2a to 2d from one another. The GW 2 according to the present embodiment is configured to include a microcomputer/microcontroller 21, an Ethernet physical layer (PHY) 22, a CAN-PHY 23, a bypass circuit 24, etc. While the microcomputer/microcontroller 21, the Ethernet PHY 22, the CAN-PHY 23, and the bypass circuit 24 are mounted as separate integrated circuits (ICs) on a circuit board of the GW 2 in the present embodiment, there is no limitation to this. Some or all of the microcomputer/microcontroller 21, the Ethernet PHY 22, the CAN-PHY 23, and the bypass circuit 24 may be mounted on the circuit board of the GW 2 as a single IC. These functional blocks, i.e., the microcomputer/microcontroller 21, the Ethernet PHY 22, the CAN-PHY 23, and the bypass circuit 24, may each be a circuit formed by a plurality of electric components mounted on the circuit board.

The microcomputer/microcontroller 21 includes a processor such as a central processing unit (CPU) or a micro-processing unit (MPU), a read only memory (ROM), a random access memory (RAM), etc., and performs various types of computational processing by executing programs stored in the ROM. In the present embodiment, the microcomputer/microcontroller 21 performs processing for relaying communication between communication lines. In FIG. 2, a relay processing unit 21a is illustrated as a software-like functional unit that performs the relay processing performed by the microcomputer/microcontroller 21. The microcomputer/microcontroller 21 includes an Ethernet communication unit 21b and a CAN communication unit 21c that perform communication processing in accordance with Ethernet communication protocol and CAN communication protocol, respectively.

The Ethernet communication unit 21b, upon receiving a message conforming to Ethernet communication protocol, acquires the data included in this message and transmits the data to the relay processing unit 21a. The Ethernet communication unit 21b, upon receiving data to be transmitted to another device from the relay processing unit 21a, transmits the data as a message conforming to Ethernet communication protocol.

Similarly, the CAN communication unit 21c, upon receiving a message conforming to CAN communication protocol, acquires the data included in this message and transmits the data to the relay processing unit 21a. The CAN communication unit 21c, upon receiving data to be transmitted to another device from the relay processing unit 21a, transmits the data as a message conforming to CAN communication protocol.

The microcomputer/microcontroller 21 can switch between a sleep state and a wake-up state. In the wake-up state, the microcomputer/microcontroller 21 performs the above-described relay processing of the relay processing unit 21a, the above-described communication processing of the Ethernet communication unit 21b, the above-described communication processing of the CAN communication unit 21c, etc. In the sleep state, the microcomputer/microcontroller 21 does not perform such processing, and reduces power consumption by stopping the oscillation of an operation clock signal, for example. The microcomputer/microcontroller 21 itself determines that a condition has been satisfied (for example, that the engine of the vehicle 100 has been stopped, the ignition switch of the vehicle 100 has been turned off, etc.), and transitions from the wake-up state to the sleep state. The microcomputer/microcontroller 21 is caused to transition from the sleep state to the wake-up state in response to an activation control signal from the bypass circuit 24.

The Ethernet PHY 22 is an IC that performs conversion between analog electric signals on a communication line and digital signals processed by the microcomputer/microcontroller 21. The Ethernet PHY 22 samples and acquires electric potentials on the Ethernet communication line connected to the GW 2, and outputs the electric potentials to the microcomputer/microcontroller 21 as digital signals. The Ethernet PHY 22 converts messages received from the microcomputer/microcontroller 21 into electric signals, and outputs the electric signals to the Ethernet communication line. In the present embodiment, the Ethernet PHY 22 can switch between a sleep state and a wake-up state. In the wake-up state, the Ethernet PHY 22 performs the above-described conversion processing between analog and digital signals. In the sleep state, the Ethernet PHY 22 performs the processing for transmitting analog signals on the communication line to the microcomputer/microcontroller 21 as digital signals, but does not output analog signals to the communication line. The Ethernet PHY 22 is switched between the sleep state and the wake-up state in response to an activation control signal from the bypass circuit 24.

Similarly, the CAN-PHY 23 is an IC that performs conversion between analog electric signals on a communication line and digital signals processed by the microcomputer/microcontroller 21. The CAN-PHY 23 samples and acquires electric potentials on the CAN communication line connected to the GW 2, and outputs the electric potentials to the microcomputer/microcontroller 21 as digital signals. The CAN-PHY 23 converts messages received from the microcomputer/microcontroller 21 into electric signals, and outputs the electric signals to the CAN communication line. In the present embodiment, the CAN-PHY 23 can switch between a sleep state and a wake-up state. In the wake-up state, the CAN-PHY 23 performs the above-described conversion processing between analog and digital signals. In the sleep state, the CAN-PHY 23 performs the processing for transmitting analog signals on the communication line to the microcomputer/microcontroller 21 as digital signals, but does not output analog signals to the communication line. The CAN-PHY 23 is switched between the sleep state and the wake-up state in response to an activation control signal from the bypass circuit 24.

If the microcomputer/microcontroller 21 is in the sleep state, the bypass circuit 24 performs processing for relaying wake-up signals in a bypassing manner. In FIG. 2, signals in a case in which a wake-up signal (wake-up signal conforming to Ethernet communication protocol) is received via the Ethernet communication line and the bypass circuit 24 outputs a wake-up signal (wake-up signal conforming to CAN communication protocol) to the CAN communication line are illustrated as broken line-arrows. In FIG. 3, signals in a case in which a wake-up signal (wake-up signal conforming to CAN communication protocol) is received via the CAN communication line and the bypass circuit 24 outputs a wake-up signal (wake-up signal conforming to Ethernet communication protocol) to the Ethernet communication line are illustrated as broken line-arrows.

As illustrated in FIG. 2, if the microcomputer/microcontroller 21 is in the sleep state, the bypass circuit 24 monitors the Ethernet communication line. When the bypass circuit 24 detects a wake-up signal on the Ethernet communication line, the bypass circuit 24 outputs a wake-up signal to the CAN communication line by activating the CAN-PHY 23 and transmitting a wake-up signal to the CAN-PHY 23. At this time, the bypass circuit 24 activates the microcomputer/microcontroller 21.

Similarly, as illustrated in FIG. 3, if the microcomputer/microcontroller 21 is in the sleep state, the bypass circuit 24 monitors the CAN communication line. When the bypass circuit 24 detects a wake-up signal on the CAN communication line, the bypass circuit 24 outputs a wake-up signal to the Ethernet communication line by activating the Ethernet PHY 22 and transmitting a wake-up signal to the Ethernet PHY 22. At this time, the bypass circuit 24 activates the microcomputer/microcontroller 21.

Note that the bypass circuit 24 may constantly operate without switching between a sleep state and a wake-up state, or may be configured so as to be capable of switching between a sleep state and a wake-up state. In either case, the bypass circuit 24 receives, from the microcomputer/microcontroller 21, a signal or the like indicating whether the microcomputer/microcontroller 21 is in the sleep state or the wake-up state. If the bypass circuit 24 switches between states, the bypass circuit 24 transitions to the sleep state if the microcomputer/microcontroller 21 transitions to the wake-up state, and transitions to the wake-up state if the microcomputer/microcontroller 21 transitions to the sleep state.

As an Ethernet wake-up signal, a signal based on Ethernet Wake-on-LAN technology may be adopted, for example. In Wake-on-LAN, a desired device can be activated by transmitting a message that includes data of a specific pattern called a magic packet. As a CAN wake-up signal, a dominant signal having a predetermined duration may be output, for example. For example, if the bypass circuit 24 receives a magic packet message on the Ethernet communication line, the bypass circuit 24 outputs a dominant signal having a predetermined duration from the CAN communication line. For example, if the bypass circuit 24 detects a dominant signal having a predetermined duration on the CAN communication line, the bypass circuit 24 outputs a message including a magic packet from the Ethernet communication line. Note that wake-up signals of any configuration may be adopted.

In the present embodiment, the bypass circuit 24 has the function of retransmitting wake-up signals. After transmitting a wake-up signal to the Ethernet communication line or the CAN communication line, the bypass circuit 24 determines the presence/absence of a response signal transmitted from a device (device such as an ECU 3 or the GW 1) connected to the communication line. If no response signal responsive to the wake-up signal is received even after a predetermined period has elapsed, the bypass circuit 24 retransmits a wake-up signal to this communication line.

Note that, in the case of CAN communication protocol, a dominant signal having a predetermined duration may be output, for example, as a response signal responsive to a wake-up signal. In a case in which a dominant signal serving as a response signal is output so as to overlap with a dominant signal output as a wake-up signal, the bypass circuit 24 can determine that the response signal has been output by sensing that the communication line is in a dominant signal state after the output of the dominant signal therefrom is completed. In the case of Ethernet communication protocol, a message including data of a specific pattern may be adopted as a response signal. Note that response signals of any configuration may be adopted.

Figure 4:
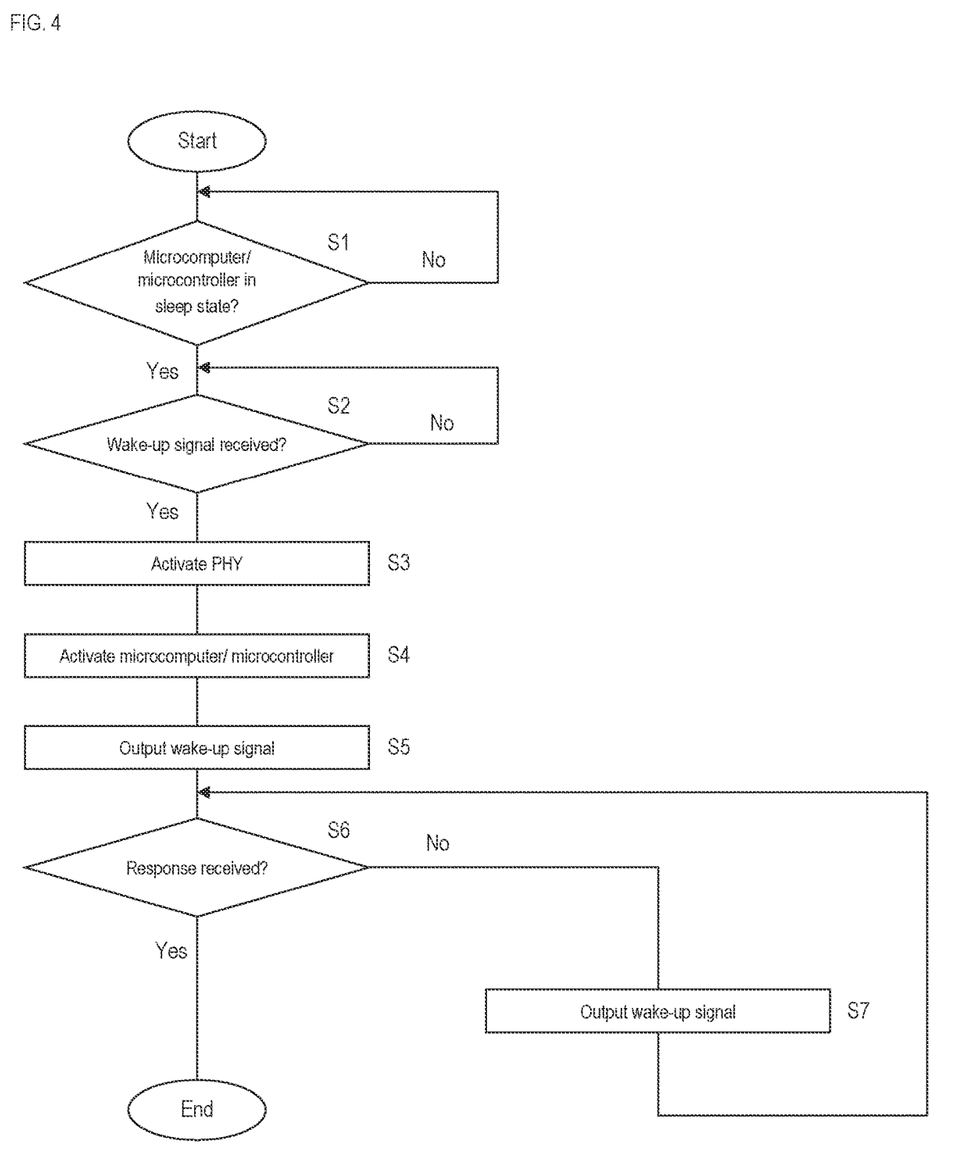
FIG. 4 is a flowchart illustrating procedures of bypass processing performed by a bypass circuit according to the present embodiments.

FIG. 4 is a flowchart illustrating procedures of bypass processing performed by the bypass circuit 24 according to the present embodiment. Note that, while a case in which a wake-up signal is relayed from the Ethernet communication line to the CAN communication line in a bypassing manner will be described in the description below, similar also applies to a case in which a wake-up signal is relayed from the CAN communication line to the Ethernet communication line in a bypassing manner. The bypass circuit 24 according to the present embodiment determines whether or not the microcomputer/microcontroller 21 is in the sleep state (step S1). If the microcomputer/microcontroller 21 is not in the sleep state (S1: NO), the bypass circuit 24 waits until the microcomputer/microcontroller 21 transitions to the sleep state.

If the microcomputer/microcontroller 21 is in the sleep state (S1: YES), the bypass circuit 24 determines whether or not a wake-up signal has been received via the Ethernet communication line (step S2). If no wake-up signal has been received (S2: NO), the bypass circuit 24 waits until a wake-up signal is received. If a wake-up signal has been received (S2: YES), the bypass circuit 24 outputs an activation control signal for activating the CAN-PHY 23 (step S3). The bypass circuit 24 outputs an activation control signal for activating the microcomputer/microcontroller 21 (step S4).

The bypass circuit 24 outputs a wake-up signal to the CAN communication line by transmitting a wake-up signal conforming to CAN communication protocol to the CAN-PHY 23 (step S5). Note that here, the bypass circuit 24 outputs the wake-up signal without waiting for the completion of the switching of the microcomputer/microcontroller 21 from the sleep state to the wake-up state.

Then, the bypass circuit 24 determines whether or not a response signal from a device connected to the CAN communication line, to which a wake-up signal was output, has been received on the communication line before a predetermined period has elapsed (step S6). If no response signal has been received even after the predetermined period has elapsed (S6: NO), the bypass circuit 24 outputs a wake-up signal to this communication line (step S7), and returns to the processing in step S6. If a response signal has been received before the predetermined period has elapsed (S6: YES), the bypass circuit 24 terminates the wake-up signal bypass processing.

Embodiment 2

Figure 5:
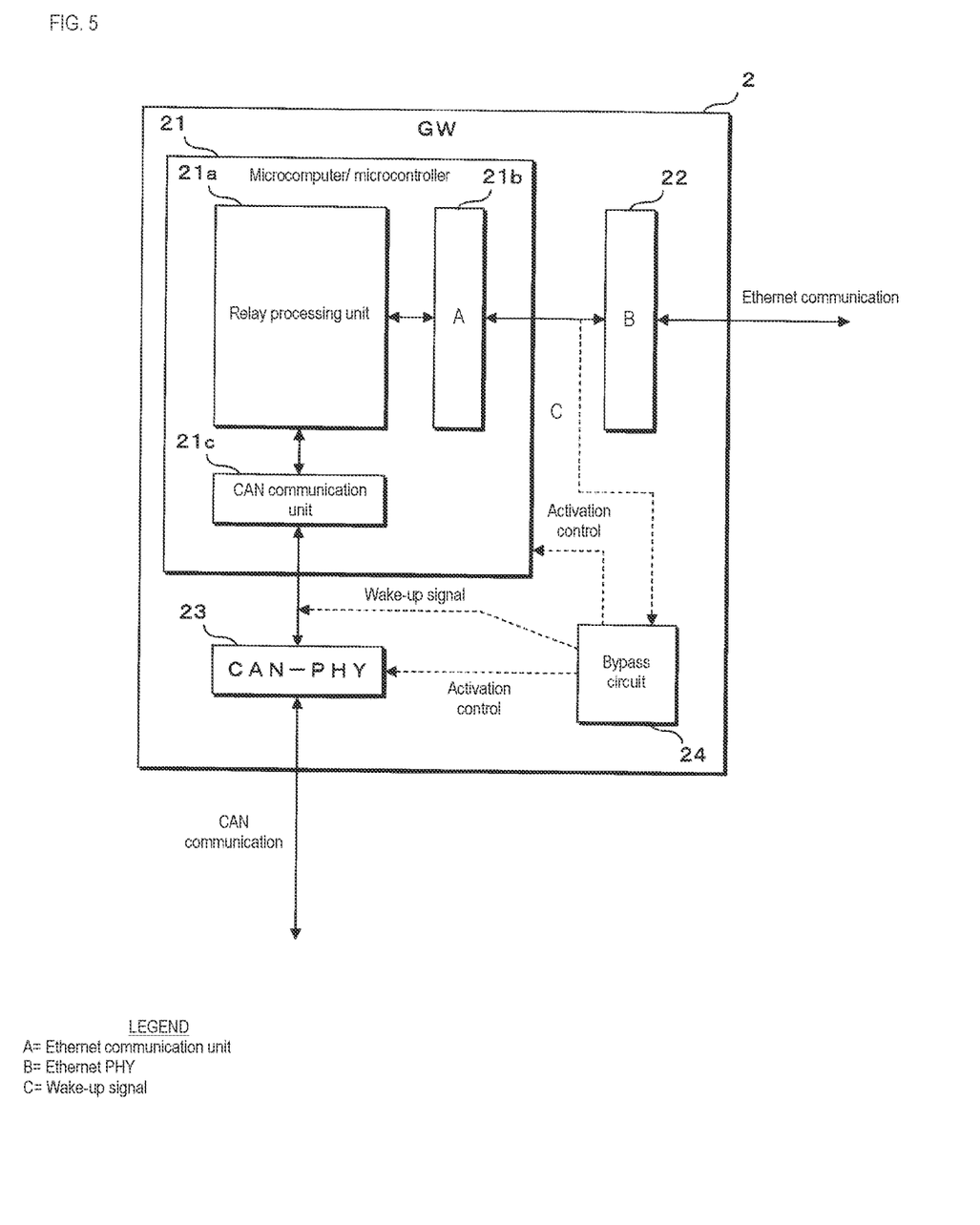
FIG. 5 is a block diagram illustrating a configuration of a GW according to embodiment 2.

FIG. 5 is a block diagram illustrating a configuration of a GW 2 according to embodiment 2. In the GW 2 according to embodiment 2, the bypass circuit 24 acquires wake-up signals converted into digital signals by the Ethernet PHY 22, rather than directly acquiring wake-up signals from the Ethernet communication line. Furthermore, while not shown in the drawings, the bypass circuit 24 according to embodiment 2 acquires wake-up signals converted into digital signals by the CAN-PHY 23, rather than directly acquiring wake-up signals from the CAN communication line. Other than these differences, the configuration of the bypass circuit 24 according to embodiment 2 is the same as the configuration of the bypass circuit 24 according to embodiment 1.

Due to the bypass circuit 24 according to embodiment 2 acquiring wake-up signals converted into digital signals by the Ethernet PHY 22 and the CAN-PHY 23, the bypass circuit 24 does not need to include a conversion circuit for converting analog signals into digital signals, and thus a reduction in size of the bypass circuit 24 can be expected.

Since the rest of the configurations of the in-vehicle communication system according to embodiment 2 are similar to those of the in-vehicle communication system according to embodiment 1, the same reference symbols are given to similar portions and detailed description is omitted.

Embodiment 3

Figure 6:
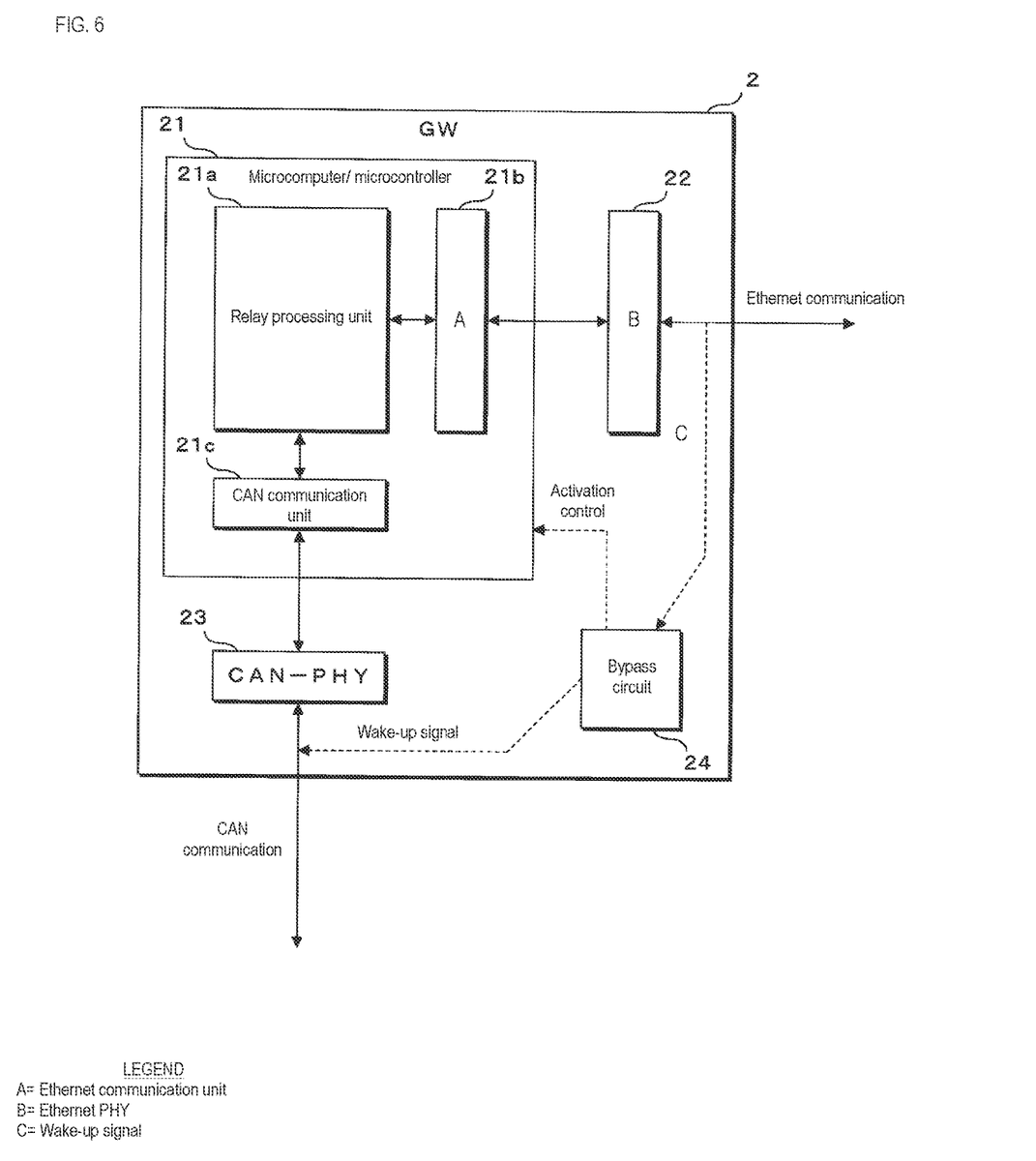
FIG. 6 is a block diagram illustrating a configuration of a GW according to embodiment 3.

FIG. 6 is a block diagram illustrating a configuration of a GW 2 according to embodiment 3. The GW 2 according to embodiment 3, the bypass circuit 24 directly outputs wake-up signals to the CAN communication line, rather than outputting wake-up signals to the CAN-PHY 23. Furthermore, while not shown in the drawings, the bypass circuit 24 according to embodiment 3 directly outputs wake-up signals to the Ethernet communication line, rather than outputting wake-up signals to the Ethernet PHY 22. Due to the bypass circuit 24 according to embodiment 3 directly outputting wake-up signals to the CAN communication line and the Ethernet communication line, there is no need to activate the CAN-PHY 23 or the Ethernet PHY 22 before outputting wake-up signals. Thus, the bypass circuit 24 according to embodiment 3 may be configured so as to not output activation control signals for the CAN-PHY 23 and the Ethernet PHY 22. The bypass circuit 24 according to embodiment 3 outputs wake-up signals as analog signals. Other than these differences, the configuration of the bypass circuit 24 according to embodiment 3 is the same as the configuration of the bypass circuit 24 according to embodiment 1.

Due to the bypass circuit 24 according to embodiment 3 being capable of directly relaying wake-up signals between the Ethernet communication line and the CAN communication line in a bypassing manner, it can be expected for wake-up signals to be relayed more quickly.

Since the rest of the configurations of the in-vehicle communication system according to embodiment 3 are similar to those of the in-vehicle communication system according to embodiment 1, the same reference symbols are given to similar portions and detailed description is omitted.

Embodiment 4

Figure 7:
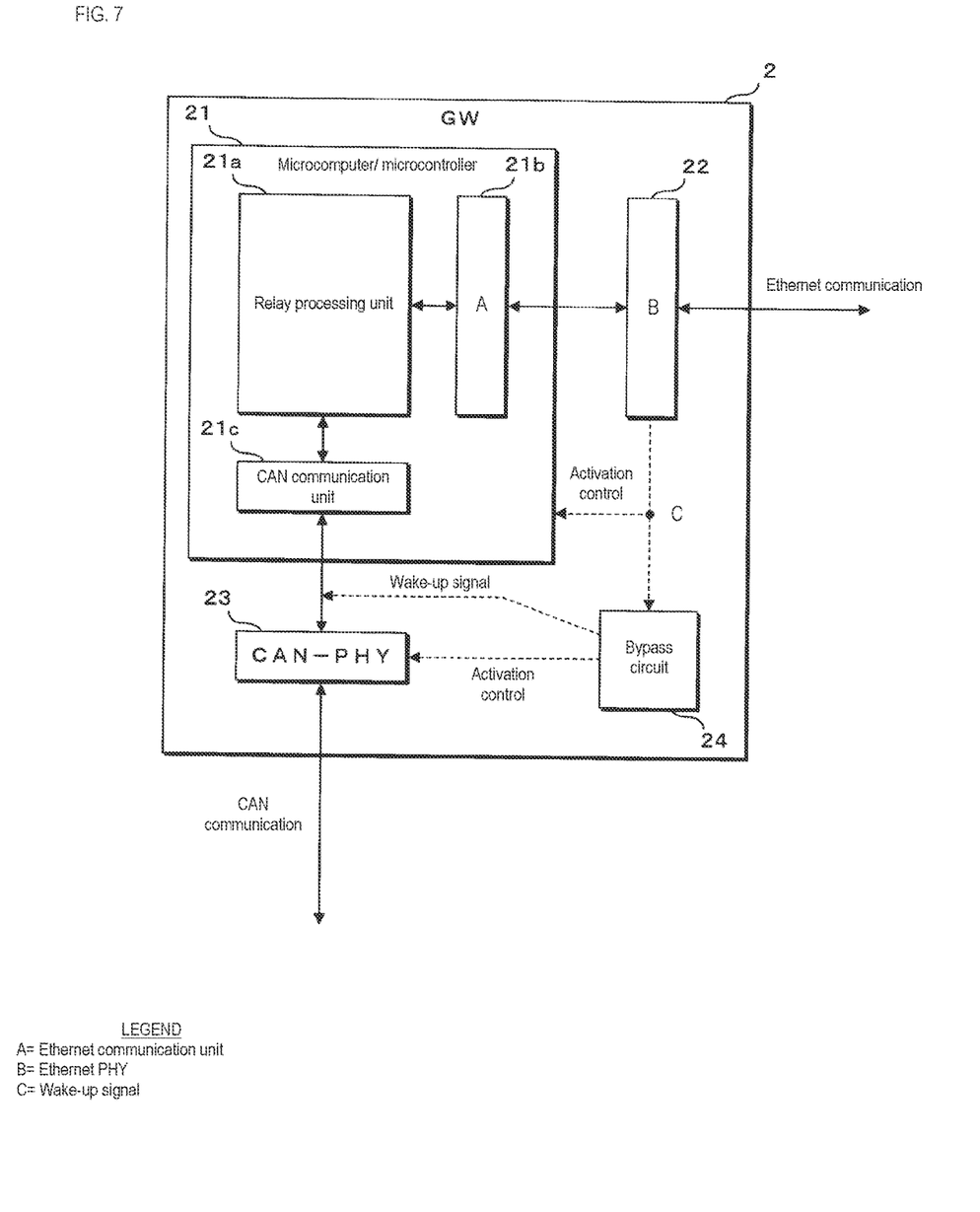
FIG. 7 is a block diagram illustrating a configuration of a GW according to embodiment 4.

FIG. 7 is a block diagram illustrating a configuration of a GW 2 according to embodiment 4. In the GW 2 according to embodiment 4, the bypass circuit 24 acquires wake-up signals from the Ethernet PHY 22, rather than acquiring wake-up signals from the Ethernet communication line. Thus, the Ethernet PHY 22 according to embodiment 4 is equipped with a function such that, if the Ethernet PHY 22 detects a wake-up signal on the Ethernet communication line, the Ethernet PHY 22 outputs, to the bypass circuit 24, a signal for providing a notification regarding the wake-up signal to the bypass circuit 24. This signal output by the Ethernet PHY 22 may be input to the microcomputer/microcontroller 21 as an activation signal. If the bypass circuit 24 receives a notification regarding a wake-up signal from the Ethernet PHY 22, the bypass circuit 24 outputs a wake-up signal to the CAN communication line by activating the CAN-PHY 23 and outputting a wake-up signal to the CAN-PHY 23.

While not shown in the drawings, the CAN-PHY 23 according to embodiment 4 is equipped with a function such that, if the CAN-PHY 23 detects a wake-up signal on the CAN communication line, the CAN-PHY 23 outputs, to the bypass circuit 24, a signal for providing a notification regarding the wake-up signal to the bypass circuit 24. This signal output by the CAN-PHY 23 may be input to the microcomputer/microcontroller 21 as an activation signal. If the bypass circuit 24 receives a notification regarding a wake-up signal from the CAN-PHY 23, the bypass circuit 24 outputs a wake-up signal to the Ethernet communication line by activating the Ethernet PHY 22 and outputting a wake-up signal to the Ethernet PHY 22.

Since the rest of the configurations of the in-vehicle communication system according to embodiment 4 are similar to those of the in-vehicle communication system according to embodiment 1, the same reference symbols are given to similar portions and detailed description is omitted.

Embodiment 5

Figure 8:
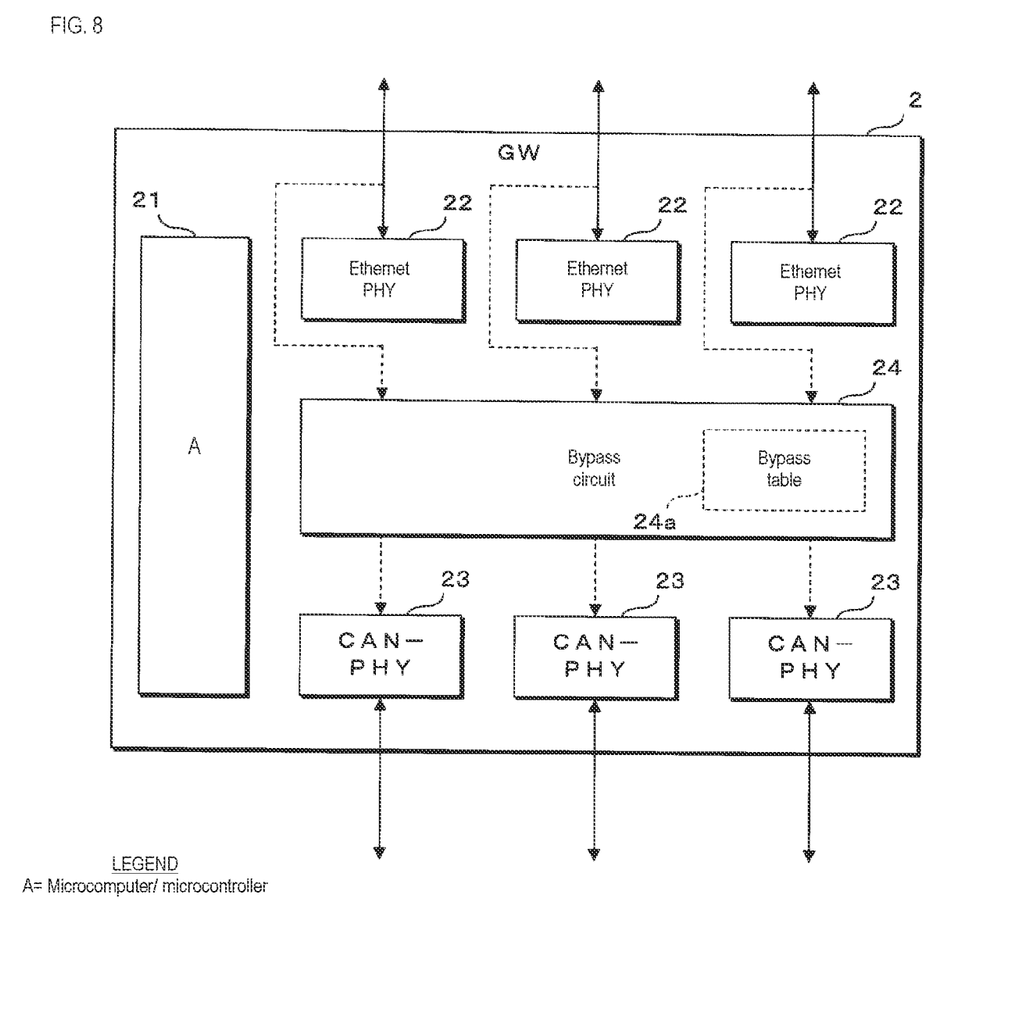
FIG. 8 is a block diagram illustrating a configuration of a GW according to embodiment 5.

FIG. 8 is a block diagram illustrating a configuration of a GW 2 according to embodiment 5. The GW 2 according to embodiment 5 includes a plurality of Ethernet PHYs 22 and a plurality of CAN-PHYs 23, and the relay processing unit 21a of the microcomputer/microcontroller 21 relays messages between a plurality of Ethernet communication lines and a plurality of CAN communication lines. Here, the relay processing unit 21a determines the relay destinations of the messages based on IDs or the like given to the messages. In the ROM of the microcomputer/microcontroller 21, a routing table in which the IDs and the relay destinations are associated with one another, or the like is stored in advance. Note that, in FIG. 8, taken by messages relayed by the microcomputer/microcontroller 21 are not shown in the drawing.

The bypass circuit 24 of the GW 2 according to embodiment 5 monitors the presence/absence of wake-up signals on each Ethernet communication line. If the bypass circuit 24 detects a wake-up signal on one Ethernet communication line, the bypass circuit 24 relays wake-up signals to one or more CAN communication lines in a bypassing manner by outputting wake-up signals to one or more CAN-PHYs 23. Here, the bypass circuit 24 may also transmit wake-up signals to one or more Ethernet communication lines other than the Ethernet communication line that received the wake-up signal.

The bypass circuit 24 according to embodiment 4 has a bypass table 24*a* for determining the relay destinations to which wake-up signals are to be relayed in a bypassing manner. For example, the bypass circuit 24 includes a non-volatile memory element such as an electrically erasable programmable read-only memory (EEPROM), and the bypass table 24*a* is stored in this memory element. In the bypass table 24*a*, the correlation between identification information given to wake-up signals and relay-destination communication lines to which the wake-up signals are to be relayed in a bypassing manner is set in advance.

Thus, wake-up signals conforming to Ethernet communication protocol transmitted and received in the in-vehicle communication system according to embodiment 5 have attached thereto identification information such as IDs of transmission-source ECUs 3, IDs of transmission-destinations ECU 3, or IDs indicating wake-up signal types, for example. In a case in which a message of a specific pattern called a magic packet is transmitted and received as a wake-up signal conforming to Ethernet communication protocol, the GW 1, the GWs 2, etc., transmit the magic packet with the identification information included therein. The bypass circuit 24 refers to the bypass table 24*a* based on the identification information attached to a wake-up signal received on one of the Ethernet communication lines, and transmits wake-up signals to the transmission-destination CAN communication line(s) (and Ethernet communication line(s)) set in the bypass table 24*a*.

While not shown in the drawings, the bypass circuit 24 according to embodiment 5 monitors the presence/absence of wake-up signals on each CAN communication line. If the bypass circuit 24 detects a wake-up signal on one CAN communication line, the bypass circuit 24 relays wake-up signals to one or more Ethernet communication lines in a bypassing manner by outputting wake-up signals to one or more Ethernet PHYs 22. Here, the bypass circuit 24 may also transmit wake-up signals to one or more CAN communication lines other than the CAN communication line that received the wake-up signal.

Thus, wake-up signals conforming to CAN communication protocol transmitted and received in the in-vehicle communication system according to embodiment 5 have attached thereto identification information such as IDs of transmission-source ECUs 3, IDs of transmission-destinations ECU 3, or IDs indicating wake-up signal types, for example. In a case in which a dominant signal having a predetermined duration is transmitted and received as a wake-up signal conforming to CAN communication protocol, the GWs 2, ECUs 3, etc., transmit the identification information continuously after transmitting the dominant signal having the predetermined duration. The bypass circuit 24 receives the identification information continuously after receiving the dominant signal having the predetermined duration on the CAN communication line. The bypass circuit 24 refers to the bypass table 24*a* based on the received identification information, and transmits wake-up signals to the transmission-destination Ethernet communication line(s) (and CAN communication line(s)) set in the bypass table 24*a*.

The GW 2 according to embodiment 5 has a plurality of Ethernet communication lines and a plurality of CAN communication lines connected thereto, and relays messages between the plurality of communication lines. The bypass circuit 24 of the GW 2 according to embodiment 5 transmits a wake-up signal received on one communication line to one or more other communication lines in a bypassing manner. In doing so, the bypass circuit 24 determines the one or more communication lines to which wake-up signals are to be transmitted by referring to the preset bypass table 24*a* based on the identification information attached to the wake-up signal.

Note that, while a configuration in which three Ethernet communication lines and three CAN communication lines are connected to the GW 2 is illustrated in FIG. 8, the number of communication lines illustrated in FIG. 8 is one example and there is no limitation to this. In FIG. 8, the activation signals from the bypass circuit 24 to the microcomputer/microcontroller 21 and from the bypass circuit 24 to the Ethernet PHY 22 and the CAN-PHY 23 are omitted from the drawing. The bypass circuit 24 according to embodiment 5 may determine whether or not to activate the microcomputer/microcontroller 21 based on the identification information attached to wake-up signals, for example. In this case, information indicating whether or not to activate the microcomputer/microcontroller 21 is stored in the bypass table 24*a* in association with the identification information of wake-up signals.

Since the rest of the configurations of the in-vehicle communication system according to embodiment 5 are similar to those of the in-vehicle communication system according to embodiment 1, the same reference symbols are given to similar portions and detailed description is omitted.

CONCLUSION

The GW 2 according to the present embodiments having the above-described configurations relays the transmission and reception of messages between an Ethernet communication line and a CAN communication line, on which communication is performed in accordance with Ethernet communication protocol and CAN communication protocol, respectively. If the microcomputer/microcontroller 21, which performs processing for relaying messages, is in the sleep state and the bypass circuit 24 of the GW 2 receives a wake-up signal conforming to Ethernet communication protocol from the Ethernet communication line, the bypass circuit 24 outputs a wake-up signal conforming to CAN communication protocol to the CAN communication line. Thus, it can be expected for a wake-up signal to be relayed at high speed because the bypass circuit 24 can output a wake-up signal conforming to CAN communication protocol to the CAN communication line and activate a device connected to the CAN communication line even if the microcomputer/microcontroller 21 does not transition from the sleep state to the wake-up state or before the microcomputer/microcontroller 21 transitions from the sleep state to the wake-up state.

Furthermore, in the GW 2 according to the present embodiments, the bypass circuit 24 outputs a control signal for activating the microcomputer/microcontroller 21 from the sleep state to enter the wake-up state. Thus, it may become unnecessary for the microcomputer/microcontroller 21 to monitor the presence/absence of wake-up signals on the communication lines in the sleep state because it suffices for the microcomputer/microcontroller 21 to activate in response to a control signal from the bypass circuit 24.

Furthermore, in the GW 2 according to the present embodiments, the microcomputer/microcontroller 21 does not activate in response to wake-up signals directly received via the communication lines, and activates in response to a signal from the bypass circuit 24. Thus, the microcomputer/microcontroller 21 can be prohibited from activating in response to wake-up signals, and the microcomputer/microcontroller 21 can be caused to activate only if deemed necessary by the bypass circuit 24.

Furthermore, in the GW 2 according to the present embodiments, if the bypass circuit 24 does not receive a response from an ECU 3, etc., connected to the CAN communication line after outputting a wake-up signal conforming to CAN communication protocol to the CAN communication line, the bypass circuit 24 retransmits the wake-up signal. Thus, the likelihood of a desired device being activated can be increased by the bypass circuit 24 retransmitting a wake-up signal even if the activation of an ECU 3, etc., in response to the wake-up signal fails for some reason.

Furthermore, a plurality of CAN communication lines are connected to the GW 2 according to embodiment 5. If the bypass circuit 24 of the GW 2 receives a wake-up signal from the Ethernet communication line, the bypass circuit 24, rather than outputting a wake-up signal to all CAN communication lines, selects a CAN communication line to which a wake-up signal conforming to CAN communication protocol is to be output based on information attached to the wake-up signal received on the Ethernet communication line. Thus, unnecessary activation of devices can be avoided.

Furthermore, the GW 2 according to the present embodiments includes the CAN-PHY 23, which converts analog signals into digital signals and vice versa between the microcomputer/microcontroller 21 and the CAN communication line. The bypass circuit 24 of the GW 2 outputs a signal for controlling the activation of the CAN-PHY 23. Thus, the amount of power consumed by the CAN-PHY 23 of the GW 2 can be reduced.

Furthermore, in the GW 2 according to the present embodiments, if the bypass circuit 24 receives a wake-up signal conforming to CAN communication protocol from the CAN communication line, the bypass circuit 24 outputs a wake-up signal conforming to Ethernet communication protocol to the Ethernet communication line. Thus, the bypass circuit 24 can relay wake-up signals in a bypassing manner in both directions between the Ethernet communication line and the CAN communication line.

Note that, while Ethernet and CAN have been mentioned in the present embodiments as communication protocols used in the in-vehicle communication system, there is no limitation to this and various communication protocols other than the Ethernet and CAN may be adopted. Furthermore, communication lines employing three or more different communication protocols may be connected to the GW 2, and in this case as well, it similarly suffices for the bypass circuit 24 to output wake-up signals conforming to the two other communication protocols to the respective communication lines if the bypass circuit 24 receives a wake-up signal conforming to one communication protocol.

Furthermore, while the bypass circuit 24 of the GW 2 according to the present embodiments is configured to relay wake-up signals in a bypassing manner in both directions from the Ethernet communication line to the CAN communication line and from the CAN communication line to the Ethernet communication line, there is no limitation to this. The bypass circuit 24 may relay wake-up signals in a bypassing manner in one direction from the Ethernet communication line to the CAN communication line or from the CAN communication line to the Ethernet communication line, and the microcomputer/microcontroller 21 may relay wake-up signals in the other direction.

Furthermore, while a configuration in which the GW 2 relays wake-up signals has been described in the present embodiments, a configuration may be adopted in which the GW 1 is similarly provided with the bypass circuit 24 and the GW 1 similarly relays wake-up signals in a bypassing manner. Since the GW 1 illustrated in FIG. 1 has a configuration in which only Ethernet communication lines are connected thereto, the bypass circuit 24 may be configured so as to relay wake-up signals in a bypassing manner by directly connecting a plurality of communication lines either physically or electrically using a circuit element such as a switch or a relay.

Each device in the in-vehicle communication system includes a computer configured so as to include a microprocessor, a ROM, a RAM, etc. A computational processing unit such as the microprocessor may read computer programs including some or all of the steps in a sequence diagram or a flowchart such as those illustrated in FIG. 4 from storage units such as the ROM and the RAM and execute the computer programs. The computer programs for the plurality of devices can each be installed from an external server device or the like. Furthermore, the computer programs for the plurality of devices are each distributed in a state in which the computer program is stored in a recording medium such as a CD-ROM, a DVD-ROM, a semiconductor memory, or the like.

The embodiments disclosed herein are examples in every way, and shall be construed as being non-limiting. The scope of the present disclosure is not limited to what is defined above, and is intended to include all modifications that are indicated by the claims and are within the meaning and scope of equivalents of the claims.

The invention claimed is:

1. An in-vehicle relay device to which a first communication line and a second communication line are connected and which relays communication between the first and the second communication lines, communication being performed in accordance with a first communication protocol and a second communication protocol on the first and second communication lines, respectively, the in-vehicle relay device comprising:

a microcomputer that can be switched to a sleep state and a non-sleep state, the microcomputer including a first non-transitory, machine-readable medium storing instructions which, when executed by at least one first programmable processor, causes the at least one first programmable processor to perform processing for relaying communication between the first and second communication lines when in the non-sleep state;

a conversion unit that is interposed between the second communication line and the microcomputer, that can be switched to a sleep state and a non-sleep state, and that, in the non-sleep state, can perform conversion between analog signals that are transmitted and received via the second communication line and digital signals that are input to and output from the microcomputer; and a bypass circuit being an integrated circuit including a second non-transitory, machine-readable medium storing instructions which, when executed by at least one second programmable processor, causes the at least one second programmable processor to transmit an activation signal conforming to the second communication protocol to the second communication line when: (1) the microcomputer is in the sleep state; and (2) the bypass circuit receives an activation signal conforming to the first communication protocol from the first communication line so as to bypass the microcomputer, and wherein the bypass circuit outputs a control signal for controlling the activation of the conversion unit.

2. The in-vehicle relay device according to claim 1, wherein the bypass circuit outputs a control signal for controlling the activation of the microcomputer.

3. The in-vehicle relay device according to claim 2, wherein the microcomputer does not activate in response to the activation signals and activates in response to the control signal.

4. The in-vehicle relay device according to claim 1, wherein, if the bypass circuit does not receive a response from a device connected to the second communication line after outputting the activation signal conforming to the second communication protocol to the second communication line, the bypass circuit outputs the activation signal conforming to the second communication protocol again.

5. The in-vehicle relay device according to claim 1, wherein a plurality of the second communication lines are connected to the in-vehicle relay device, and
the bypass circuit selects the second communication line to which the activation signal conforming to the second communication protocol is to be output based on information attached to the activation signal conforming to the first communication protocol received from the first communication line.

6. The in-vehicle relay device according to claim 1, wherein, if the bypass circuit receives the activation signal conforming to the second communication protocol from the second communication line, the bypass circuit outputs the activation signal conforming to the first communication protocol to the first communication line.

7. A relay method comprising:
providing a first communication line and a second communication line;
providing an in-vehicle relay device connected to the first communication line and the second communication line;
relaying communication between the first communication line and the second communication line in accordance with a respective first communication protocol and a second communication protocol; wherein
the processing for relaying communication between the first and second communication lines is performed by a microcomputer in a non-sleep state;
providing a conversion unit interposed between the second communication line and the microcomputer, that can be switched to a sleep state and a non-sleep state, and that, in the non-sleep state, performs conversion between analog signals that are transmitted and received via the second communication line and digital signals that are input to and output from the microcomputer; and
an activation signal conforming to the second communication protocol is output to the second communication line and bypasses the microcomputer when the microcomputer is in a sleep state and an activation signal conforming to the first communication protocol is received from the first communication line.

* * * * *